(12) United States Patent
Mao et al.

(10) Patent No.: US 11,811,245 B2
(45) Date of Patent: Nov. 7, 2023

(54) WIRELESS CHARGING METHOD, DEVICE AND SYSTEM

(71) Applicant: NXP USA, Inc., Austin, TX (US)

(72) Inventors: Huan Mao, Suzhou (CN); Dechang Wang, Suzhou (CN); Dengyu Jiang, Suzhou (CN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/807,910

(22) Filed: Jun. 21, 2022

(65) Prior Publication Data

US 2022/0416588 A1 Dec. 29, 2022

(30) Foreign Application Priority Data

Jun. 23, 2021 (CN) .......................... 202110701201.4

(51) Int. Cl.
*H02J 50/80* (2016.01)
*G05D 23/19* (2006.01)
*H02J 50/10* (2016.01)

(52) U.S. Cl.
CPC .......... *H02J 50/80* (2016.02); *G05D 23/1923* (2013.01); *H02J 50/10* (2016.02)

(58) Field of Classification Search
CPC ...................................... H02J 50/10
See application file for complete search history.

(56) References Cited

U.S. PATENT DOCUMENTS

| | | |
|---|---|---|
| 5,248,955 A | 9/1993 | Laubmann |
| 2018/0115197 A1 | 4/2018 | Li et al. |
| 2019/0109499 A1* | 4/2019 | Smith ................ H02M 3/156 |
| 2021/0083525 A1* | 3/2021 | Stingu ............... G01R 33/0206 |
| 2021/0281120 A1* | 9/2021 | Bhandarkar ....... G01R 27/2611 |
| 2022/0302768 A1* | 9/2022 | Shichino ................ H02J 50/10 |

FOREIGN PATENT DOCUMENTS

| | | |
|---|---|---|
| CN | 104285417 A | 1/2015 |
| EP | 1978641 A | 10/2008 |

* cited by examiner

*Primary Examiner* — Daniel Kessie

(57) ABSTRACT

A method of compensating for temperature dependent Q factor variations in a wireless charger includes receiving, by the wireless charger, a reference Q factor value from a device to be charged. The method also includes the wireless charger determining a Q factor threshold value from the reference Q factor. The method further includes the wireless charger measuring a Q factor associated with a transmit coil of the wireless charger. The method also includes determining a temperature value. The method further includes applying a temperature compensation calculation to the measured Q factor using the temperature value to produce a temperature compensated Q factor. The method also includes comparing the temperature compensated Q factor with the Q factor threshold value. The method may also include compensation for temperature dependent internal power loss values.

13 Claims, 5 Drawing Sheets

WIRELESS CHARGING METHOD, DEVICE AND SYSTEM

CROSS-REFERENCE TO RELATED APPLICATIONS

This application claims the priority under 35 U.S.C. § 119 of China application no. 202110701201.4, filed on 23 Jun. 2021, the contents of which are incorporated by reference herein.

BACKGROUND

The present specification relates to a wireless charging method, device and system.

In wireless charging system, changes in coil Q factor may be used to detect a foreign objects. Maintaining charging in the presence of a foreign object may cause heating of the foreign object. Accordingly, detection of these objects can facilitate ceasing the charging process, so as to prevent heating of the objects.

A wireless charging transmitter can measures the Q factor of coil and compare it with a threshold. The threshold may be determined by a reference coil Q-factor value sent from the receiver of the device being charged. The reference coil Q-factor value itself may be measured with an LCR meter in the lab (i.e. prior to sale) at room temperature about 25° C.

However, the working temperature of some (e.g. automotive) wireless charging systems could vary from around −40° C. to +80° C. Moreover, the temperature of the transmitter coil (TX) may rise during charging. In such cases, the Q factor of the coil will change since the equivalent series resistance of TX and RX coils change with temperature. This change in temperature, leading to a change in Q factor, may cause the detection of foreign objects to fail or produce false positives.

SUMMARY

Aspects of the present disclosure are set out in the accompanying independent and dependent claims. Combinations of features from the dependent claims may be combined with features of the independent claims as appropriate and not merely as explicitly set out in the claims.

According to an aspect of the present disclosure, there is provided method of compensating for temperature dependent Q factor variations in a wireless charger, the method comprising:

the wireless charger receiving a reference Q factor value from a device to be charged;

the wireless charger determining a Q factor threshold value from the reference Q factor;

the wireless charger measuring a Q factor associated with a transmit coil of the wireless charger;

determining a temperature value;

applying a temperature compensation calculation to the measured Q factor using the temperature value to produce a temperature compensated Q factor; and comparing the temperature compensated Q factor with the Q factor threshold value.

The method may further include determining the potential presence of a foreign object other than the device to be charged in the vicinity of the wireless charger based on the comparison of the temperature compensated Q factor with the Q factor threshold value.

The method may further include, in response to determining the potential presence of a foreign object other than the device to be charged in the vicinity of the wireless charger, ceasing charging of the device to be charged.

The method may further include using at least one stored temperature calibration parameter to apply the temperature compensation calculation.

The or each stored temperature calibration parameter may be associated with a change in coil resistance (and resonance circuit equivalent serial resistance) as a function of temperature.

The reference Q factor value received from the device to be charged may be pre-measured Q factor associated with a predetermined temperature.

The method may further include:

measuring a power loss value for the wireless charger;

applying a temperature compensation calculation to an internal power loss value using the temperature value to produce a temperature compensated internal power loss value;

calculating a corrected power loss value using the temperature compensated internal power loss value;

comparing the corrected power loss value with a predetermined power loss limit value; and determining the potential presence of a foreign object other than the device to be charged in the vicinity of the wireless charger based on the comparison of the corrected power loss value with the predetermined power loss limit value.

According to another aspect of the present disclosure, there is provided a non-transitory computer-readable medium storing executable instructions to cause a processor of a wireless charger to perform the method set out above.

According to a further aspect of the present disclosure, there is provided a wireless charger comprising:

a transmit coil for coupling with a receive coil of a device to be charged; and a processor operable to:

receive a reference Q factor value from the device to be charged;

determine a Q factor threshold value from the reference Q factor;

measure a Q factor associated with a transmit coil of the wireless charger;

determine a temperature value;

apply a temperature compensation calculation to the measured Q factor using the temperature value to produce a temperature compensated Q factor; and compare the temperature compensated Q factor with the Q factor threshold value.

The wireless charger may include a temperature sensor for determining the temperature value.

The wireless charger may be operable to determine the potential presence of a foreign object other than the device to be charged in the vicinity of the wireless charger based on the comparison of the temperature compensated Q factor with the Q factor threshold value.

In response to determining the potential presence of a foreign object other than the device to be charged in the vicinity of the wireless charger, the wireless charger may be operable to cease charging of the device to be charged.

In response to determining the potential presence of a foreign object other than the device to be charged in the vicinity of the wireless charger, the wireless charger may be operable to reduce a wireless power signal transmitted to the device to be charged.

The wireless charger may further include a memory storing at least one temperature calibration parameter for applying the temperature compensation calculation.

The or each stored temperature calibration parameter may be associated with a change in coil resistance as a function of temperature.

The processor may be further operable to:

measure a power loss value for the wireless charger;

apply a temperature compensation calculation to the internal power loss value using the temperature value to produce a temperature compensated internal power loss value;

calculate a corrected power loss value using the temperature compensated internal power loss value;

compare the corrected power loss value with a predetermined power loss limit value; and determine the potential presence of a foreign object other than the device to be charged in the vicinity of the wireless charger based on the comparison of the corrected power loss value with the predetermined power loss limit value.

According to another aspect of the present disclosure, there is provided a wireless charging system comprising the wireless charger set out above and the device to be charged.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

In wireless charging systems including a wireless charger and a device to be charged, coil Q factors may be used to detect foreign objects (FOs) in the vicinity of the wireless charger. Detection of foreign objects can allow steps to be taken to avoid heating of the object, which may otherwise cause damage to the wireless charger and/or the device being charged.

The specification of the Qi standard defines that the transmitter (TX) (the wireless charger) measures the Q value of the transmit coil in the presence of the device to be charged, and compares it to a threshold value. This comparison can be used to detect the presence of foreign objects. The threshold is determined by a reference Q value, which is reported to (e.g. transmitted to) the wireless charger by the device to be charged. The reference Q value may be based upon the known configuration of the receive coil of the device to be charged, assuming a standard wireless charger coil and the absence of any foreign objects in the vicinity of the wireless charger.

If the Q factor measured by the wireless charger is lower than threshold Q value $Q_{threshold}$, the wireless charger may determine that a foreign object is present and may take steps such as reducing the power of the wireless charging signal that it transmits or ceasing charging operations completely.

The threshold Q value $Q_{threshold}$ may be expressed by the equation:

$$Q_{threshold}=Q_{ref}*\text{percent}$$

whereby the threshold Q value $Q_{threshold}$ is some percentage of the reference Q value $Q_{ref}$ sent to the wireless charger by the device to be charged.

Figure 1:
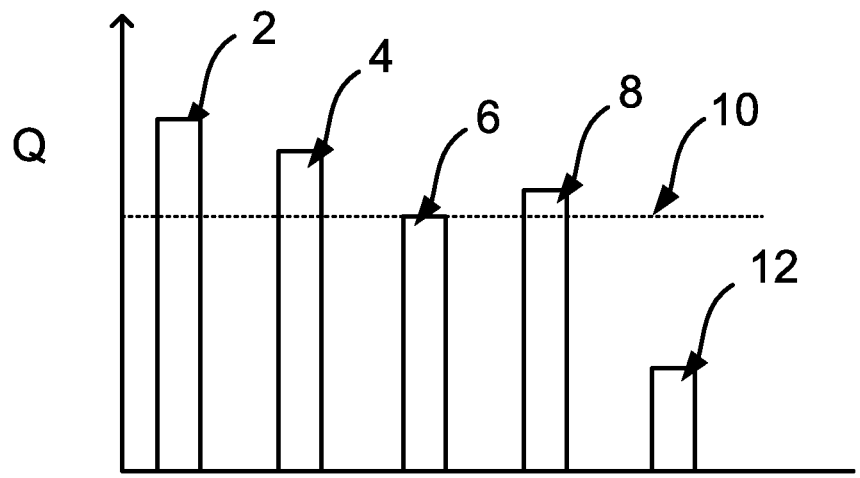
FIG. 1 illustrates Q factor threshold benchmarking.

FIG. 1 illustrates Q factor threshold benchmarking. In FIG. 1, the Q value 2 is the reference Q value $Q_{ref}$ sent to the wireless charger by the device to be charged. The Q value 4 is the threshold value $Q_{threshold}$, calculated as a percentage of $Q_{ref}$ (e.g. 90%). Optionally, the threshold value $Q_{threshold}$ may be further modified to allow tolerances for manufacturing variations and errors in the measurement process. This modified value is represented in FIG. 1 by the Q value 6, which defines the final value 10 of $Q_{threshold}$, which will be used by the wireless charger to determine the presence of foreign objects. For instance, if the measured Q factor is above the value 10 of $Q_{threshold}$ (e.g. see measured Q value 8), then it may be determined that no foreign object is present, while if the measured Q factor is below the value 10 of $Q_{threshold}$ (e.g. see measured Q value 12), then it may be determined that a foreign object is present.

Figure 2:
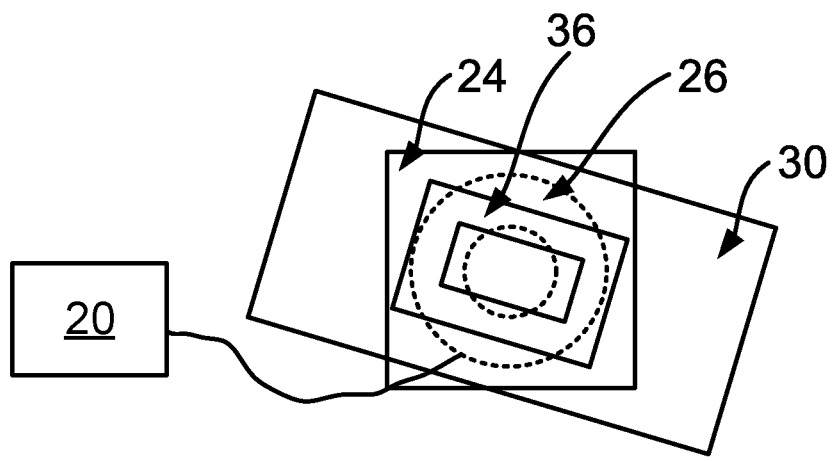
FIG. 2 illustrates how a reference Q factor may be measured.

FIG. 2 illustrates how the reference Q factor $Q_{ref}$ may be determined during manufacture of the device to be charged. As noted above, in practice, this reference Q factor $Q_{ref}$ may be stored in memory of the device to be charged and then transmitted to the wireless charger before or during charging operations, to enable the wireless charger to determine the presence of foreign objects.

A standard transmit coil in a wireless charger has an inductance of 24.8 μH at a frequency of 100 KHz. A typical Q factor of the coil in the absence of foreign objects is 162.5 at 100 KHz.

In the calibration set up of FIG. 2, an LCR meter 20 (an LCR meter is a type of electronic test equipment used to measure the inductance (L), capacitance (C), and resistance (R) of an electronic component) is used to measure the Q value of a standard transmit coil 26 with the device under test 30 (i.e. the device to be charged, including a receive coil 36) placed upon the standard transmit coil 26 in an assembly 24.

Many wireless chargers use different kinds of transmit coils having different sizes, inductances, Q factors and so forth. To take this into account, an algorithm may be applied as will be described below in relation to FIG. 3, which shows a wireless charging transmit (TX) resonance circuit 40. The algorithm involves converting the Q value measured using the set up shown in FIG. 2 to a standard Q value ($Q_{coil}$), which may be used in the above discussed comparison with $Q_{threshold}$, to determine the potential presence of foreign objects.

Figure 3:
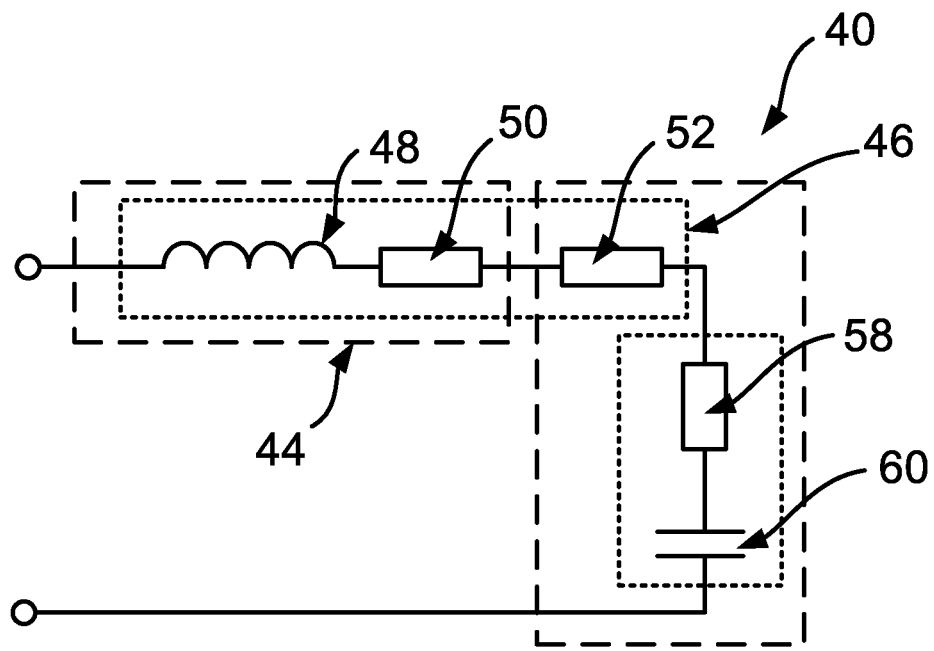
FIG. 3 shows a wireless charging TX resonance circuit.

In FIG. 3, wireless charging transmit (TX) resonance circuit 40 includes an inductance 48 (representing the inductance of the transmit coil of the wireless charger), and a capacitance 60. The inductance 48 and capacitance 60 are assumed to have equivalent series resistances, and components of the wireless charger such as switching components and printed circuit board (PCB) traces have a parasitic resistance. The resistances 50 and 52 are the equivalent series resistances of the transmit coil, and resistance 58 consists of equivalent series resistances of the capacitance 60 and the parasitic resistance for the resistor convention algorithm.

The algorithm applies a resistance convention to delineate the components of the wireless charging transmit (TX) resonance circuit 40 in terms of a virtual transmit coil 44 having the same resistance as a standard transmit coil. In FIG. 3, the delineation of the components shown at 46 are the components of the actual ("real") transmit coil. The value R'$_{par}$ of the resistances 52, 58 is obtained in the calibration phase described below.

The calibration is generally performed at or around room temperature (e.g. 25° C.) and the algorithm that is used is as follows:

$$R_{coil1} = 2\pi f_s L/Q_{coil}$$

$$R_{lc} = (L/C)^{0.5}/Q_{lc}$$

$$R'_{par} = R_{lc} - R_{coil1}$$

where $f_s$ is the frequency used when testing reference Q (e.g. 100 KHz) and $Q_{coil}$ is the Q factor expected for a standard coil (e.g. 162.5). L is the inductance value of the inductance 48 and C is the capacitance value of the capacitance 60. $R_{coil1}$ is the resistance value of resistance 50. $R_{lc}$ is the resistance of resonance circuit 40 and $Q_{lc}$ is the Q value of resonance circuit 40. R'$_{par}$ is the resistance value of the parasitic resistance 52 and 58. The Q factor value $Q_{lc}$ of the series LC circuit shown in FIG. 3 may be measured using, for instance, the free resonance method or by frequency sweeping. After this step, the parameter R'$_{par}$ can be obtained and saved for later use.

In practice, when a wireless charger is subsequently charging a device to be charged, the Q factor of the resonance circuit $Q_{lc0}$ and the resonance frequency with the device to be charged present can be calculated as follows:

$$L_0 = 1/4\pi^2 f^2 C$$

$$R_{lc0} = (L_0/C)^{0.5}/Q_{lc0}$$

$$R_{coil0} = R_{lc0} - R'_{par}$$

$$Q_{coil0} = 2\pi f_s L_0/R_{coil0}$$

where $Q_{coil0}$ is the Q value calibrated to a standard test coil, for comparison with the aforementioned threshold Q value $Q_{threshold}$ directly. $L_0$ is the value of inductance of the transmit coil with the device to be charged present, f is the resonance frequency with the device to be charged present, $R_{lc0}$ is the equivalate resistance of the resonance circuit and $Q_{lc0}$ is the Q value of the resonance circuit 40 with the device to be charged present. The values of f and $Q_{lc0}$ are measured using, for instance, the free resonance method or by frequency sweeping with the device to be charged present.

Figure 4:
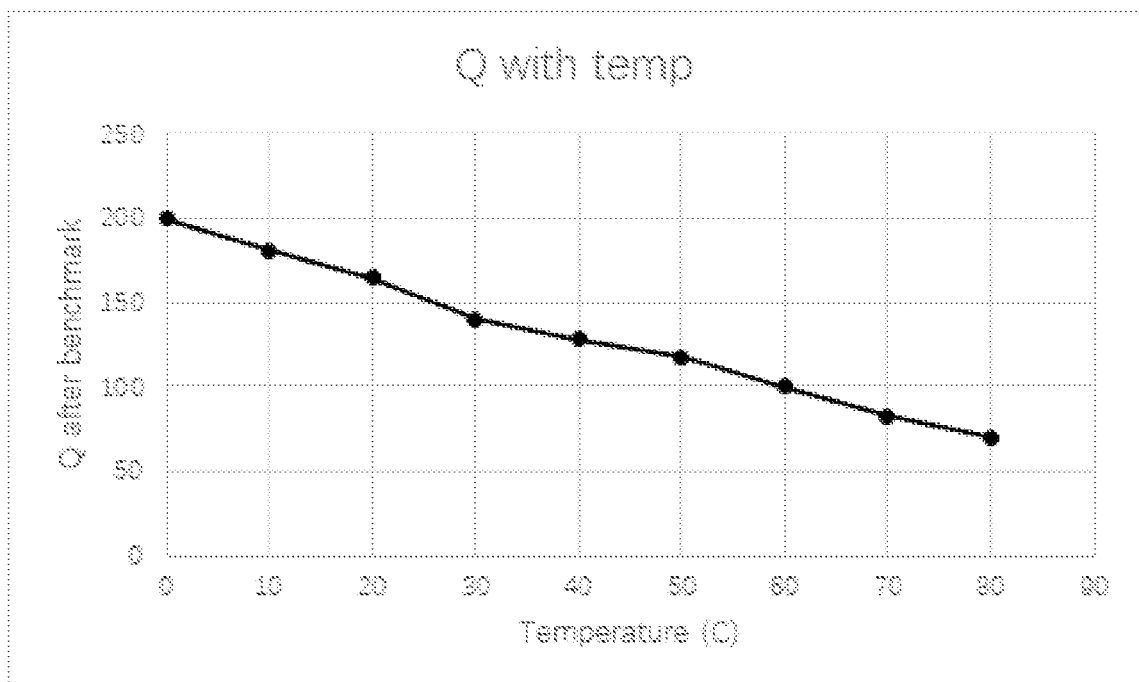
FIG. 4 shows an example of the variation of Q with temperature according to an embodiment of this disclosure.

As mentioned above, the reference Q value $Q_{ref}$ is generally measured at or around room temperature. However, in practice, when a wireless charger is being used by the end user, the ambient temperature in the vicinity of the wireless charger may vary significantly from the temperature at which reference Q value $Q_{ref}$ was determined prior to shipping. For instance, wireless chargers may in practice be used in temperatures varying from −40° C. to 85° C. Moreover, during charging operations, the temperature of the components (e.g. a PCB incorporating the transmit coil) of the wireless charger may rise over time, due to currents flowing within the wireless charger (e.g. the transmitter coil and surrounding components). As is illustrated in FIG. 4, these variations in temperature affects the Q factor of the transmit coil. In particular, it can be seen from FIG. 4 that the Q factor of the transmit coil generally decreases with increasing temperature. At or near room temperature (e.g. 25° C.), the Q factor of the transmit coil without the device to be charged present may be around the standard value of 162.5. However, FIG. 4 shows that the Q factor of the transmit coil may vary considerably from this value, depending upon the temperature.

The relationship between $R_{lc}$ and $Q_{lc}$ may be expressed as follows:

$$Q_{lc} = (L/C)^{0.5}/R_{lc}$$

where L is the coil inductance of the transmit coil and C is resonance capacitance. L and C may generally be relatively stable with changing temperature. However, the resistance $R_{lc}$ of the resonance circuit including the transmit coil, changes with temperature. The change in $R_{lc}$ is the primary source of the variation of $Q_{lc}$ demonstrated by the graph in FIG. 4. The variation in Q factor with changing temperature may be rise to errors in the above described process for determining the presence of any foreign objects in the vicinity of the wireless charger. Typically, at higher temperatures, the drop in Q factor may lead to false positive determinations of the presence of a foreign object (since $Q_{lc}$ may artificially fall below $Q_{threshold}$). Conversely, the higher Q factors present at lower temperatures may prevent $Q_{lc}$ falling below $Q_{threshold}$, even if a foreign object is present.

In accordance with embodiments of this disclosure, the measured Q factor value $Q_{lc}$ may be converted into a temperature corrected Q factor value $Q'_{lc}$. $Q'_{lc}$ may, for instance, be the Q factor value that would be present if the wireless charger were at room temperature (e.g. the temperature at which the aforementioned value of $Q_{ref}$ was calibrated, e.g. 25° C.), and not at its actual temperature, which may be higher or lower than room temperature. The temperature corrected Q factor value $Q'_{lc}$ may then be calibrated to $Q'_{coil0}$ of the standard coil, which is used to measure reference Q, with all conversion parameters at room temperature. $Q'_{coil0}$ may then be compared with the threshold value $Q_{ref}$ to determine the potential presence of foreign objects in a manner which factors out temperature variations. Accordingly, a wireless charger according to embodiments of this disclosure may be provided with a temperature sensor for determining the temperature in the vicinity of the transmit coil of the wireless charger at the time that the foreign object determination is being performed.

Figure 5:
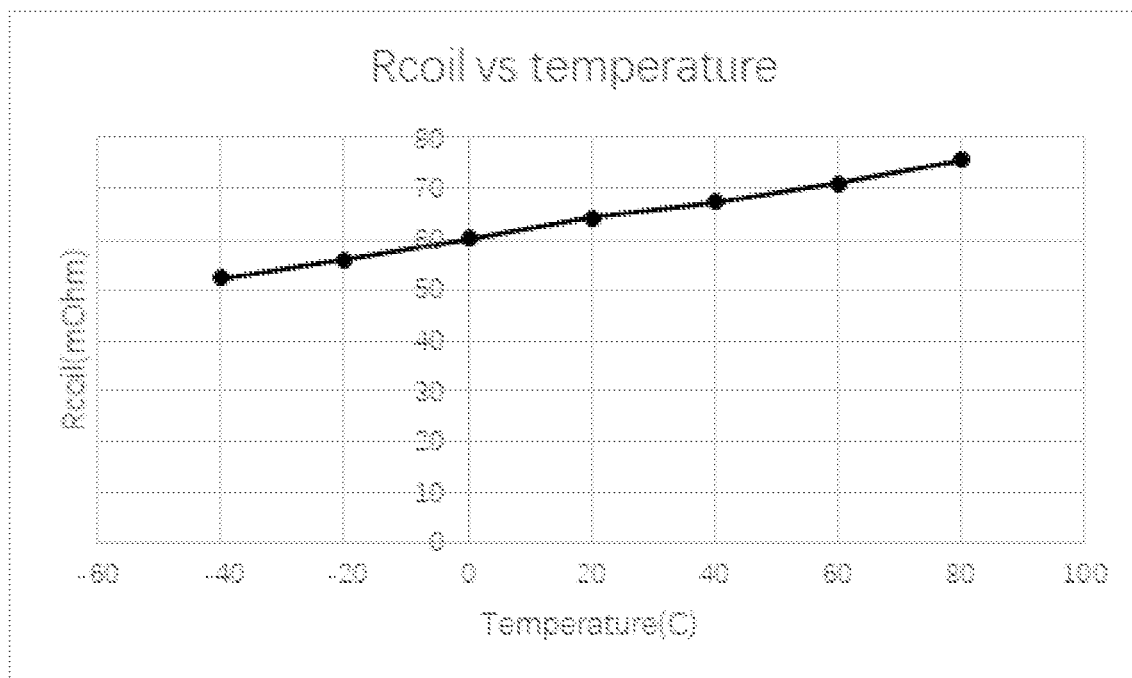
FIG. 5 shows an example of the variation of $R_{coil}$ with temperature according to an embodiment of this disclosure.

FIG. 5 illustrates the relationship between the resistance $R_{coil}$ of one type of transmit coil (to which the Qi specification applies) and temperature. As may be appreciated from FIG. 5, the relationship between $R_{coil}$ and temperature may be substantially linear. Accordingly, the value of $R_{coil}$ as a function of temperature may be expressed by:

$$R_{coil} = aT + b$$

where a is a constant defining the slope of the plot shown in FIG. 5 and b is the value of $R_{coil}$ at 0° C. The equivalent series resistance of the resonance circuit may be modelled using a fit to a linear (or second order or higher order) function, according to the characteristics of the specific resonance circuit and its components.

If the wireless charging working environment temperature is higher than room temperature (e.g. 40° C., which may be a normal room temperature in summer or in a car), the measured Q value ($Q_h$) may be lower than the Q factor at normal room temperature ($Q_{normal}$, e.g. 25° C.). As noted previously, this may lead to false positives being produced in the foreign object detection process. Conversely, if the temperature is lower than normal room temperature (e.g. close to 0° C.) then the measured Q factor ($Q_t$) may be higher than $Q_{normal}$. As noted previously, this may lead to false negatives being produced in the foreign object detection process.

The coefficients a and b in the equation shown above may be obtained by performing a calibration process during manufacture, (e.g. of the kind described above in relation to FIGS. 2 and 3) involving taking measurements at two (or more) different temperatures. In some embodiments, the temperatures used be spread across a range of at least 20° C. for higher accuracy. The values a and b may then be stored in a controller memory of the wireless charger.

The relationship between R changes and temperature changes may be described by the following equation:

$$\Delta R = a \Delta T$$

During normal charging operations, the wireless charger may measure the Q factor as explained previously, along with the charging resonance frequency f and $L_0$. Using these measurements, the resistance of the transmitter coil $R_{lc0}$ with the device to be charged present may be obtained using:

$$R_{lc0} = 2\pi f L_0 / Q_{lc0}$$

The temperature sensor of the wireless charger may then be used to determine the temperature of the transmit coil. The calibrated resistance of the LC circuit incorporating the transmit coil is then:

$$R'_{lc0} = R_{lc0} - a \Delta T$$

where $\Delta T$ is the difference in temperature between the temperature indicated by the temperature sensor and the room temperature value explained above (e.g. 25° C.). This can in turn allow the calibrated, temperature corrected Q value $Q'_{lc0}$ to be obtained:

$$Q'_{lc0} = 2\pi f L_0 / R'_{lc0}$$

Because $Q'_{lc0}$ corresponds to the measured Q value, corrected for temperature changes, it may then be used directly in the equations for $L_0$, $R_{lc0}$, $R_{coil0}$ and $Q_{coil0}$ explained above, to produce a Q value calibrated to a standard test coil, for comparison with threshold Q value $Q_{threshold}$. This approach may therefore factor out temperature variations, thereby improving the integrity and accuracy of the foreign object detection process. If the calibrated Q value is smaller than $Q_{threshold}$ then the presence of a foreign object may be determined, and the wireless charging power may be reduced or charging operations may be stopped. On the other hand, if the calibrated Q value is larger than $Q_{threshold}$ then the absence of a foreign object may be determined, and the wireless charging may continue.

Figure 6:
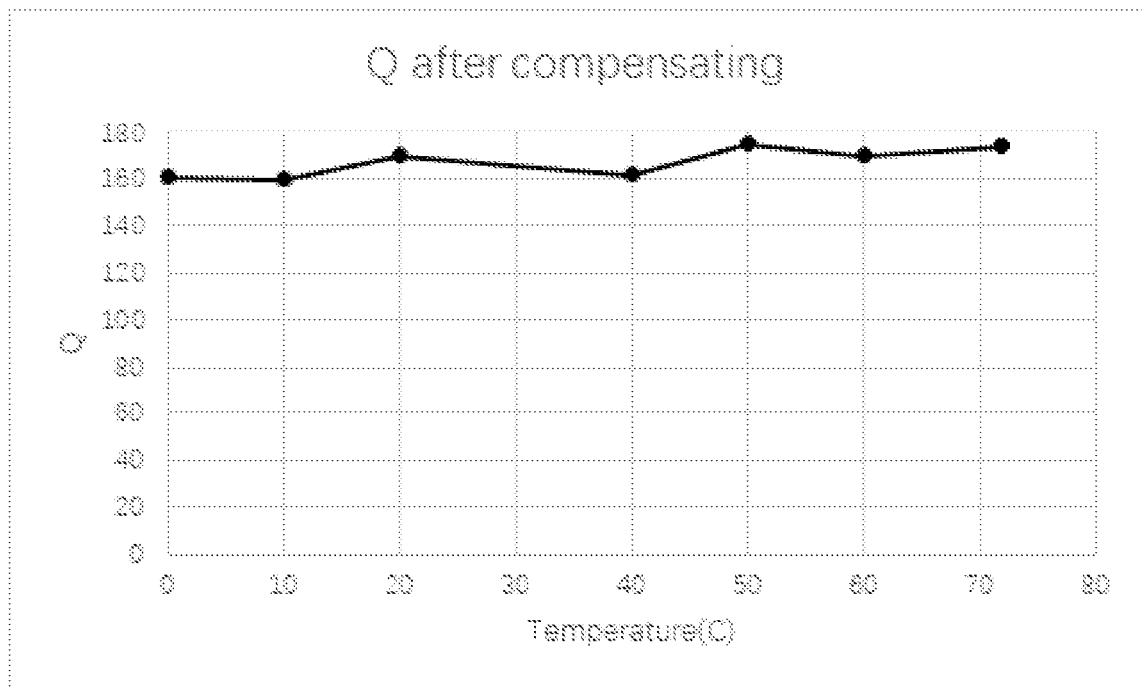
FIG. 6 shows an example of the variation of Q with temperature, following a temperature compensation calibration according to an embodiment of this disclosure.

FIG. 6 shows an example of the variation of Q with temperature, after the above described temperature compensation steps have been performed, according to an embodiment of this disclosure. Note that the temperature variation shown in FIG. 4 is now largely absent. The residual variations in Q with temperature shown in FIG. 6 fall within an accuracy of +/−15%, which is acceptable in the Qi specification.

Figure 7:
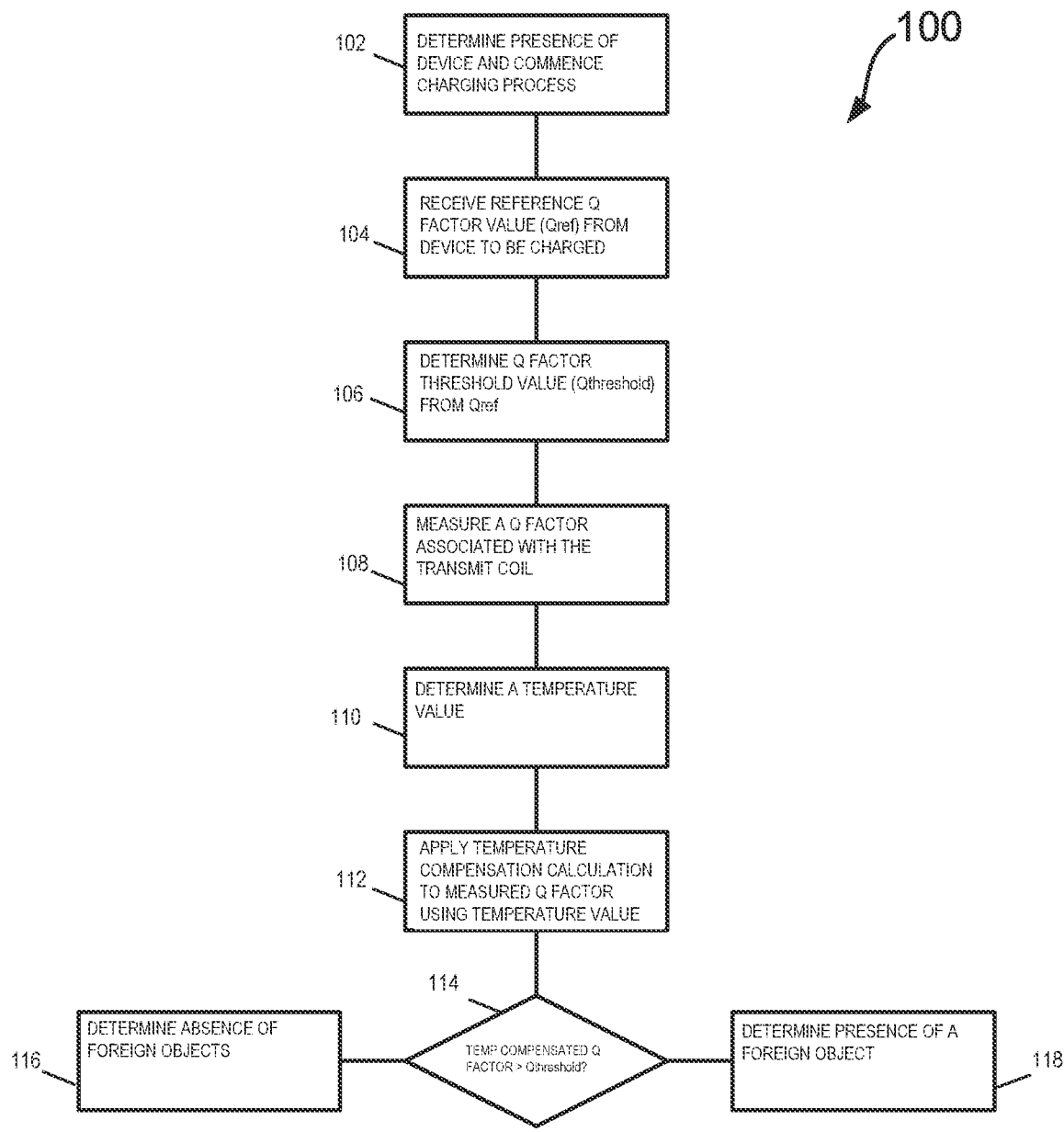
FIG. 7 shows a method of compensating for temperature dependent Q factor variations in a wireless charger according to an embodiment of this disclosure.

FIG. 7 shows a method 100 of compensating for temperature dependent Q factor variations in a wireless charger according to an embodiment of this disclosure.

The method 100 includes the wireless charger determining the presence of a device to be charged and commencing a charging process in step 102. Actual charging of the device may or may not begin until after the foreign object detection steps described below have been performed.

In step 104, the wireless charger receives the above described reference Q factor value ($Q_{ref}$) from a device to be charged. The reference Q factor value may be a pre-measured Q factor associated with predetermined temperature (e.g. room temperature, for instance 25° C.) as explained previously.

In step 106, the wireless charger determines the Q factor threshold value ($Q_{threshold}$) from the reference Q factor, for example as described above.

In step 108, the wireless charger measures a Q factor associated with the transmit coil of the wireless charger as noted above. The free resonance method or frequency sweeping may, for instance, be used.

In step 110, the wireless charger determines a temperature value as explained above, for instance using a temperature sensor of the wireless charger. In step 112, the wireless charger applies a temperature compensation calculation to the measured Q factor using the temperature value to produce a temperature compensated Q factor, as explained previously. This may involve using at least one stored temperature calibration parameter to apply the temperature compensation calculation. The or each stored temperature calibration parameter may be associated with a change in coil resistance of the transmit coil of the wireless charger as a function of temperature (e.g. parameters a and/or b described above).

In step 114, compares the temperature compensated Q factor with the Q factor threshold value.

If in step 114 it is determined that the temperature compensated Q factor exceeds the Q factor threshold value $Q_{threshold}$, the wireless charger may determine an absence of foreign objects and may continue the charging process in step 116. On the other hand, if in step 114 it is determined that the temperature compensated Q factor fall below the Q factor threshold value $Q_{threshold}$, the wireless charger may determine the presence of a foreign object. In step 118, the wireless charger may take steps to avoid heating of the foreign object, such as ceasing charging of the device to be charged or reducing a power of a wireless charging signal transmitted to the device to be charged.

A wireless charger according to an embodiment of this disclosure may include a transmit coil and a processor for performing the methodology described above. The wireless charger may also include a temperature sensor for determining the temperature value for performing the temperature compensation calculation. The processor may be included in a controller of the wireless charger. The wireless charger (e.g. the controller) may also include memory for storing the aforementioned temperature calibration parameter(s) (e.g. parameters a and/or b described above).

In addition to the approaches described above, in some embodiments, the wireless charge may also be operable to use temperature compensation for improving the accuracy of foreign object detection processes which involve the use of power loss calculations (for instance, compatible with the aforementioned Qi standard specification.

Figure 8:
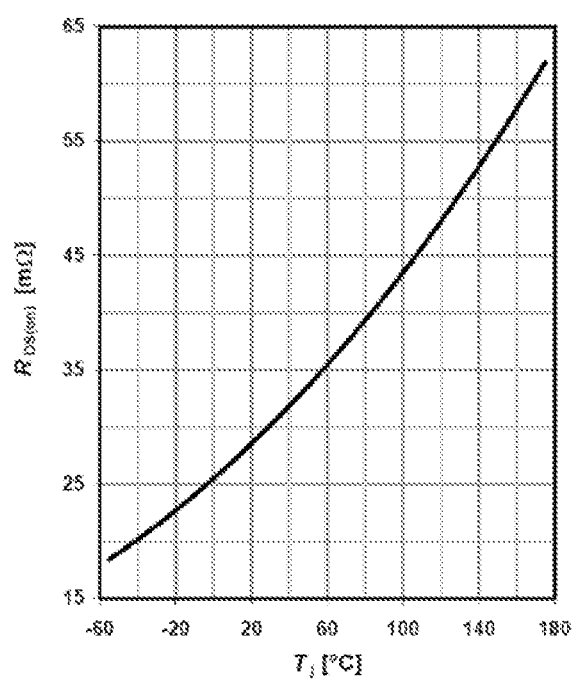
FIG. 8 shows the on state resistance ($R_{dson}$) of a typical Metal Oxide Semiconductor Field Effect Transistor (MOSFET) as a function of temperature.

In a wireless charger of the kind described above, the power components are sensitive to changes in temperature. By way of example, the on state resistance, $R_{dson}$, of transistors (e.g. Metal Oxide Semiconductor Field Effect Transistors (MOSFETs) in the system may vary according to temperature, as demonstrated in the example graph shown in FIG. 8. Accordingly, the resistance of the transmit coil and the power electronics of the wireless charger may vary with temperature, leading to differing internal power losses within the wireless charger as a function of temperature.

The power loss calculations noted above for determining the presence of foreign objects, which are typically also based on a calibration made at room temperature, may therefore also lead to the false determinations (e.g. false positives, or false negatives) regarding the presence of foreign objects, depending upon temperature.

To address to this problem, embodiments of this disclosure may perform a temperature correction, to improve the foreign object detection process using power loss calculations.

In one embodiment, the wireless charger may apply a temperature compensation calculation to the internal power loss value calculation using the temperature value mentioned above. The temperature compensation calculation may produce a temperature compensated internal power loss value. This temperature compensated internal power loss value may then be used to calculate a corrected power loss value, which may then be compared with a predetermined power loss limit value. The internal power loss value may be obtained during a calibration process analogous to that described above in relation to FIG. 3 at room temperature and may then be corrected for temperature using compensation. Accordingly, the corrected power loss value may be compared with the predetermined power loss value for a more accurate determination of the potential presence of a foreign object, in a manner which factors out temperature variations.

The power loss calibration may involve the calculation:

$$P_{loss} = P_{in} - P_{internloss} - P_{rxreported}$$

where $P_{loss}$ is the power loss total, $P_{in}$ is the input power to an inverter of transmitter, $P_{internloss}$ are the internal power losses of wireless charger, and $P_{rxreported}$ is the power received and reported at the device to be charged. The internal power losses $P_{internloss}$ are therefore important to the power loss calculation, and temperature based changes in $P_{internloss}$, owing to factors such as temperature derived changes in $R_{coil}$, $R_{dson}$ and the equivalent series resistance of inductor(s) and capacitor(s) of the transmit circuit can lead to errors in the foreign object detection process.

In the calibration process (analogous to the process described above in relation to FIGS. 2 and 3), several measurements of $P_{interloss}$ can be made at various temperatures and coil currents, so as to derive $P_{interloss}$ as a function of the current in the transmit coil and temperature:

$$P_{interloss\_Temp} = F(I_{coil}, T)$$

The function F shown above may thus be obtained by performing a calibration process during manufacture, (e.g. of the kind described above in relation to FIGS. 2 and 3) involving taking measurements at two (or more) different temperatures. In some embodiments, the temperatures used be spread across a range of at least 20° C. for higher accuracy. The values of a may then be stored in a controller memory of the wireless charger.

Subsequently, for foreign object detection, the function F shown above may be used to perform a temperature compensation calculation on an internal power loss value. As noted above, this corrected value may then be used to calculate the corrected power loss value for $P_{loss}$, which may then be compared with a predetermined power loss limit value for improved accuracy in the foreign object detection process. The predetermined limit value may be a threshold value. For instance, if the power losses are greater than the threshold value, then the presence of a foreign objection may be determined, whereas if the power losses do not exceed the threshold, it may be determined that no foreign object is present.

The methods described may be implemented as a computer program that may be stored in a memory of the wireless charger. The computer program may be executed by a processor of the wireless, e.g. in a controller thereof. As such, in one embodiment, there may be provided a non-transitory computer-readable medium storing executable instructions to cause a processor of a wireless charger to perform the methods described above.

In one embodiment, there may be provided a wireless charging system. The wireless charging system may include a wireless charger of the kind described above, and one or more devices to be charged.

Accordingly, there has been described a method of compensating for temperature dependent Q factor variations in a wireless charger. A wireless charger. A wireless charging system. The method includes the wireless charger receiving a reference Q factor value from a device to be charged. The method also includes the wireless charger determining a Q factor threshold value from the reference Q factor. The method further includes the wireless charger measuring a Q factor associated with a transmit coil of the wireless charger. The method also includes determining a temperature value. The method further includes applying a temperature compensation calculation to the measured Q factor using the temperature value to produce a temperature compensated Q factor. The method also includes comparing the temperature compensated Q factor with the Q factor threshold value. The method may also include compensation for temperature dependent internal power loss values. The method may further include calculating corrected power loss values and comparing them with a power loss limit value.

Although particular embodiments of this disclosure have been described, it will be appreciated that many modifications/additions and/or substitutions may be made within the scope of the claims.

The invention claimed is:

1. A method of compensating for temperature dependent Q factor variations in a wireless charger, the method comprising:
   the wireless charger receiving a reference Q factor value from a device to be charged;
   the wireless charger determining a Q factor threshold value from the reference Q factor;
   the wireless charger measuring a Q factor associated with a transmit coil of the wireless charger;
   a temperature sensor of the wireless charger determining a temperature value;
   applying a temperature compensation calculation to the measured Q factor using the temperature value to produce a temperature compensated Q factor, by:
      determining a resistance of the transmit coil from the measured Q factor,
      determining a calibrated resistance from the resistance of the transmit coil using the measured temperature value and a stored temperature calibration parameter, and
      determining the temperature compensated Q factor from the calibrated resistance; and
   comparing the temperature compensated Q factor with the Q factor threshold value.

2. The method of claim 1, further comprising determining the potential presence of a foreign object other than the device to be charged in the vicinity of the wireless charger based on the comparison of the temperature compensated Q factor with the Q factor threshold value.

3. The method of claim 2, further comprising, in response to determining the potential presence of a foreign object other than the device to be charged in the vicinity of the wireless charger, ceasing charging of the device to be charged.

4. The method of claim 1, wherein determining the calibrated resistance from the resistance of the transmit coil is performed using the stored temperature calibration parameter and a difference between the measured temperature and a reference temperature.

5. The method of claim 4, wherein the stored temperature calibration parameter is associated with a change in coil resistance as a function of temperature.

6. The method of claim 1, wherein the reference Q factor value received from the device to be charged is pre-measured Q factor associated with predetermined temperature.

7. A method of compensating for temperature dependent Q factor variations in a wireless charger, the method comprising:
    the wireless charger receiving a reference Q factor value from a device to be charged;
    the wireless charger determining a Q factor threshold value from the reference Q factor;
    the wireless charger measuring a Q factor associated with a transmit coil of the wireless charger;
    determining a temperature value;
    applying a temperature compensation calculation to an internal power loss value using the temperature value to produce a temperature compensated internal power loss value;
    calculating a corrected power loss value using the temperature compensated internal power loss value;
    comparing the corrected power loss value with a predetermined power loss limit value; and
    determining the potential presence of a foreign object other than the device to be charged in the vicinity of the wireless charger based on the comparison of the corrected power loss value with the predetermined power loss limit value.

8. A non-transitory computer-readable medium storing executable instructions to cause a processor of a wireless charger to perform the method of claim 1.

9. A wireless charger comprising:
    a transmit coil for coupling with a receive coil of a device to be charged; and
    a processor operable to:
        receive a reference Q factor value from the device to be charged;
        determine a Q factor threshold value from the reference Q factor;
        measure a Q factor associated with a transmit coil of the wireless charger;
        determine a temperature value;
        measure a power loss value for the wireless charger;
        apply a temperature compensation calculation to the internal power loss value using the temperature value to produce a temperature compensated internal power loss value;
        calculate a corrected power loss value using the temperature compensated internal power loss value;
        compare the corrected power loss value with a predetermined power loss limit value; and
        determine the potential presence of a foreign object other than the device to be charged in the vicinity of the wireless charger based on the comparison of the corrected power loss value with the predetermined power loss limit value.

10. The wireless charger of claim 9, comprising a temperature sensor for determining the temperature value.

11. The wireless charger of claim 9, wherein in response to determining the potential presence of a foreign object other than the device to be charged in the vicinity of the wireless charger, the wireless charger is operable to cease charging of the device to be charged.

12. The wireless charger of claim 9, wherein in response to determining the potential presence of a foreign object other than the device to be charged in the vicinity of the wireless charger, the wireless charger is operable to reduce a wireless power signal transmitted to the device to be charged.

13. The wireless charger of claim 9, further comprising a memory storing at least one temperature calibration parameter for applying the temperature compensation calculation.

* * * * *